(12) United States Patent
Berke et al.

(10) Patent No.: US 9,395,790 B2
(45) Date of Patent: *Jul. 19, 2016

(54) POWER MANAGEMENT SYSTEM

(71) Applicant: Dell Products L.P., Round Rock, TX (US)

(72) Inventors: Stuart Allen Berke, Austin, TX (US); George G. Richards, III, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/942,335

(22) Filed: Nov. 16, 2015

(65) Prior Publication Data

US 2016/0070328 A1   Mar. 10, 2016

Related U.S. Application Data

(63) Continuation of application No. 13/647,113, filed on Oct. 8, 2012, now Pat. No. 9,189,045.

(51) Int. Cl.
*G06F 1/32* (2006.01)
*G06F 1/28* (2006.01)
*G06F 1/26* (2006.01)

(52) U.S. Cl.
CPC ............ *G06F 1/3206* (2013.01); *G06F 1/3287* (2013.01); *G06F 1/26* (2013.01); *G06F 1/28* (2013.01)

(58) Field of Classification Search
CPC ............... G06F 1/32; G06F 1/28; G06F 1/26; G06F 1/00
USPC ......... 713/300, 310, 320, 321, 322, 323, 324, 713/340, 375

See application file for complete search history.

(56) References Cited

U.S. PATENT DOCUMENTS

| 5,384,547 | A | 1/1995 | Lynk, Jr. et al. | |
|---|---|---|---|---|
| 7,206,960 | B2* | 4/2007 | Barr | G06F 1/206 370/395.21 |
| 8,156,287 | B2 | 4/2012 | Bose et al. | |
| 8,487,473 | B2* | 7/2013 | Peterson | G06F 1/263 307/147 |
| 2004/0220630 | A1* | 11/2004 | Mongeon | A61N 1/3956 607/9 |

(Continued)

OTHER PUBLICATIONS

Charles Lefurgy, Xiaorui Wang and Malcolm Ware; "Power Capping: A Prelude to Power Shifting;" 2007, IBM Research, Austin and University of Tennessee, Knoxville.

*Primary Examiner* — Jaweed A Abbaszadeh
*Assistant Examiner* — Keshab Pandey
(74) *Attorney, Agent, or Firm* — Haynes and Boone, LLP

(57) ABSTRACT

A power management system includes a power system. A powered component is coupled to the power system. A power detect circuit is coupled to the power system. A power system controller is coupled to the power system, the powered component, and the power detect circuit. The power system controller is operable, for each of at least one workload run using the powered component, to program the power detect circuit with a first threshold for a first system operation setting and determine that the first threshold was not exceeded while the workload was running. The power system controller is then operable to program the power detect circuit with a second threshold for the first system operation setting, determine that the second threshold was exceeded while the workload was running and, in response, use the second threshold to allocate power from the power system.

20 Claims, 9 Drawing Sheets

(56) References Cited

U.S. PATENT DOCUMENTS

2007/0198864 A1 8/2007 Takase
2010/0220603 A1* 9/2010 Zhang ............... H04B 1/7113
                                                          370/252
2014/0101475 A1 4/2014 Berke et al.

* cited by examiner

POWER MANAGEMENT SYSTEM

CROSS-REFERENCE TO RELATED APPLICATIONS

This is a Continuation application to U.S. Utility application Ser. No. 13/647,113, filed Oct. 8, 2012, entitled "POWER MANAGEMENT SYSTEM," the disclosures of which is incorporated herein by reference in their entirety.

BACKGROUND

The present disclosure relates generally to information handling systems, and more particularly to power management system in an information handling system.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

The power requirements of IHSs are steadily increasing. For example, as processors have added cores and other processing features, the sustainable power requirements, dynamic power requirements, and peak power requirements of the power system have increased. Traditionally, processor thermal design power (TDP) has been used for (indefinitely) sustainable power requirement budgeting purposes, and only a small amount of additional power was budgeted for dynamic power requirements and peak power requirements that are above the TDP of the processor. However, as the number of processor cores has increased (from 1, to 2, to 4, to 8, and to 10 and higher), the ability of all cores to simultaneously transition from an idle state to an active state has driven the dynamic power requirements and peak power requirements rapidly relative to the sustainable power requirements. For example, maximum or peak power ("$P_{max}$", typically sustainable on the order of milliseconds to tens of milliseconds) has grown from 1.3×TDP, to 1.6×TDP, and up to 2.2×TDP, and dynamic power ("$P_{dyn}$", typically sustainable on the order of hundreds of milliseconds to seconds) has grown from 1.0×TDP, to 1.2×TDP, to 1.6×TDP for some processors in the last 5 years. Processor cores and other computing elements can activate on the order of nanoseconds, which is orders of magnitude faster than conventional monitoring and throttling mechanisms can respond.

Worst case theoretical dynamic power requirements and peak power requirements are typically determined to describe all possible processor usage models, including those that are very unlikely or that may only be realized by a small subset of users and applications. For example, worst case theoretical requirements may consider a small subset of the processor instruction set that is only used in specific high performance computing (HPC) workloads, "thermal virus" level code segments that require micro-architectural knowledge to generate, worst case processor operating parameters (e.g., worst case voltage, temperature, process, etc.), 100% processor/system utilization (typical utilization is between 30-70%), and/or a variety of other worst case scenarios known in the art. As these worst case theoretical dynamic power requirements and peak power requirements have grown, the difference between the actual or measured dynamic power requirements and peak power requirements and those worst case theoretical requirements has grown as well.

Furthermore, denser systems are requiring more and more from the power system. Conventional servers today have 2 to 4 processors, with newer designs having 4 to 8 processors and some emerging architectures having dozens of processors. Other computing elements such as, for example, memory, graphics controllers, co-processors, network controllers, drives, etc., are also dramatically increasing their dynamic and peak power requirements compared to their "TDP" or sustainable power requirements. These other computing elements may have dynamic and peak power requirements that have substantially different durations and duty cycles than those required by processors As the number of processors and other high-power devices in the system grows, it becomes less and less feasible to budget the power system based on theoretical dynamic power requirements and peak power requirements, as those theoretical requirements drive excessive power systems that are costly, inefficient, and difficult (if not impossible) to implement.

Accordingly, it would be desirable to provide an improved power management system.

SUMMARY

According to one embodiment, a power management system includes a power system; a powered component coupled to the power system; a power detect circuit coupled to the power system; and a power system controller coupled to the power system, the powered component, and the power detect circuit, wherein the power system controller is operable, for each of at least one workload run using the powered component, to: program the power detect circuit with a first threshold for a first system operation setting; determine that the first threshold was not exceeded; program the power detect circuit with a second threshold for the first system operation setting; and determine that the second threshold was exceeded and, in response, use the second threshold to allocate power from the power system.

BRIEF DESCRIPTION OF THE DRAWINGS

FIG. 2b is a schematic view illustrating an embodiment of a peak detect circuit in the power management system of FIG. 2a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
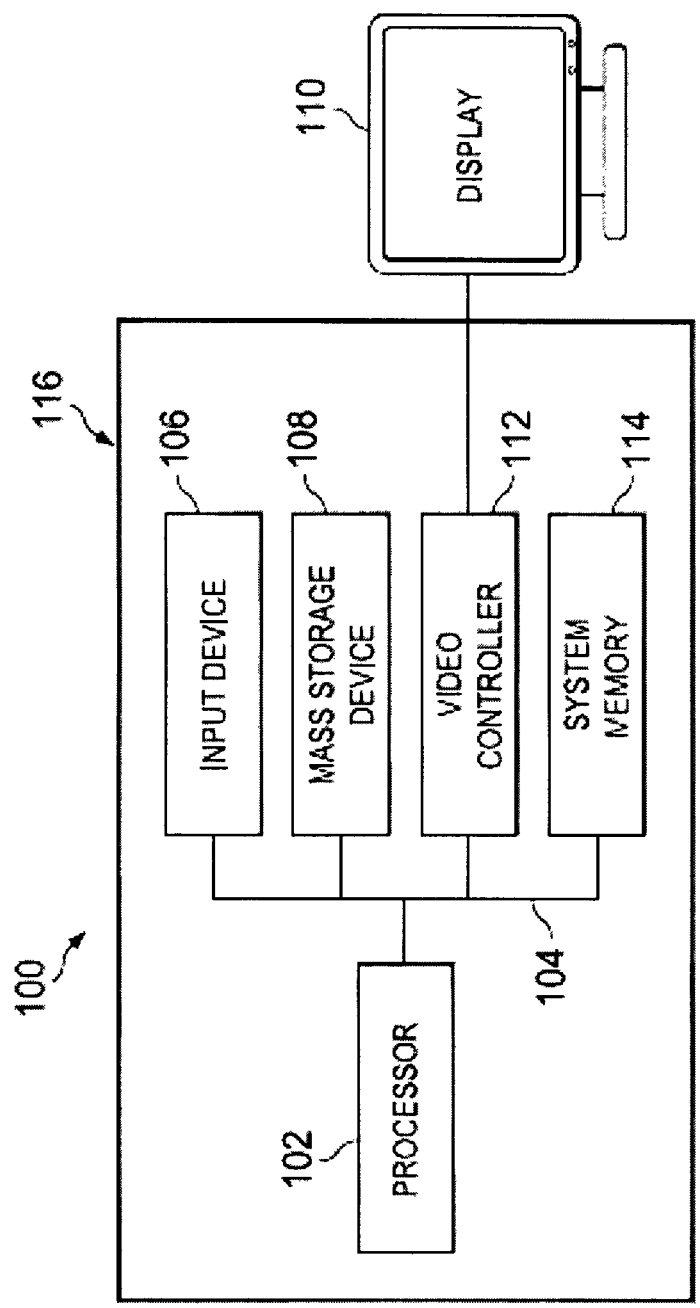
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
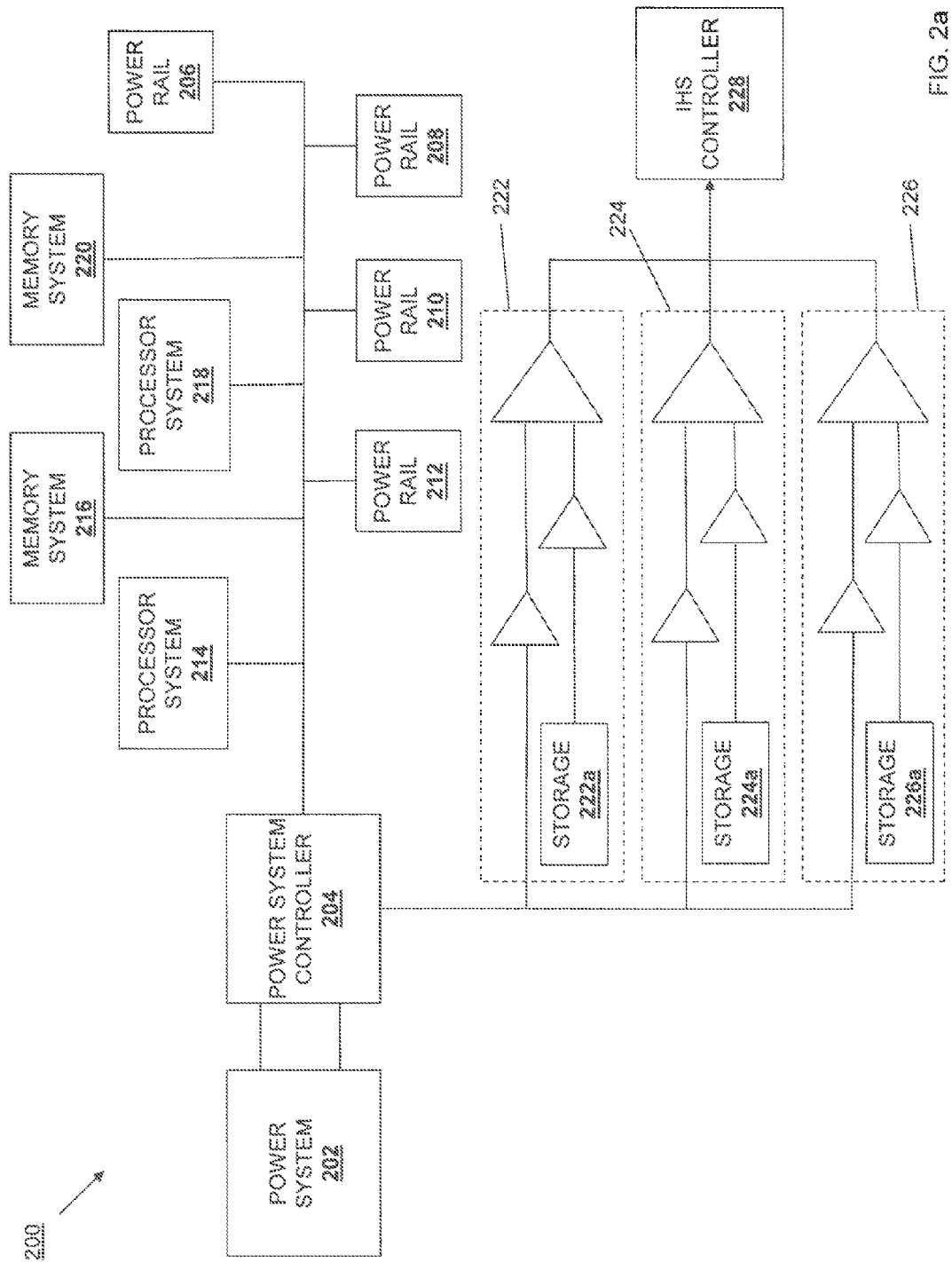
FIG. 2a is a schematic view illustrating an embodiment of a power management system.

Referring now to FIG. 2a, an embodiment of a power management system 200 is illustrated. As discussed in further detail below, the power management system 200 may be implemented in or with a variety of IHSs known in the art. For example, the power management system 200 may be implemented as part of the IHS 100, discussed above with reference to FIG. 1, which may include a server IHS, a desktop IHS, a laptop IHS, a tablet IHS, a mobile phone IHS, and/or a variety of other IHSs known in the art. In another example, the power management system 200 may be implemented as a modular IHS such as, for example, a blade server. As such, in some embodiments, all of the elements in the power management system 200 may be housed in an IHS chassis (e.g., the chassis 116 discussed above with reference to FIG. 1), while in other embodiments, elements of the power management system may be coupled to the IHS (e.g., a plurality of modular IHSs may be coupled to a power system that may include Power Supply Units (PSUs), Power Distribution Units (PDUs), and/or a variety of other power system components known in the art.) Thus, a wide variety of modification to the specific embodiments discussed below is envisioned as falling within the scope of the present disclosure, including but not limited to distribution of the components across one or more IHSs.

The power management system 200 includes a power system 202 that is operable to received power and provide that power to components in the system (e.g., IHS components). For example, in the embodiment described below, the power system 202 may include power system components that receive Alternating Current (AC) power, convert the AC power to Direct Current (DC) power (e.g., approximately 12.2 volts), and provide the DC power to the system. However, a variety of different power systems operating in a variety of different manners are envisioned as falling within the scope of the present disclosure. A power system controller 204 is coupled to the power system 202. In an embodiment, the power system controller 204 may include a Basic Input/Output System (BIOS), a Baseboard Management Controller (BMC), and/or a variety of other IHS management entities known in the art. In an embodiment, the power system controller 204 is operable to determine the current that is supplied from the power system 202 to the IHS, to program the system for peak detection, discussed in further detail below, and to provide a variety of other power system management and control functions known in the art. The power system controller 204 provides DC power to the system through a plurality of power rails 206, 208, 210, and 212. For example, the power system controller 204 may provide 5 volts through the power rail 206, 1.1 volts through the power rail 208, 1.5 volts through the power rail 210, and 3.3 volts through the power rail 212. However, a variety of different power distribution configurations are envisioned as falling within the scope of the present disclosure.

A plurality of powered components are coupled to the power system controller 204 including, in the illustrated embodiment, a processor system 214, a memory system 216 (e.g., for the processor system 214), a processor system 218, and a memory system 220 (e.g., for the processor 218.) However, one of skill will recognize that a variety of other IHS components such as, for example, graphics processor systems, storage systems, and input/output (I/O) systems, may be coupled to and receive power from the power system 202 and power system controller 204. Furthermore, each of the powered components (e.g., the processor system 214) or groups of powered components (e.g., the processor systems 214 and 218) may include a powered component voltage regulator (e.g., a Point of Load (POL) voltage regulator) that regulates voltage and provides that regulated voltage to that powered component or group of powered components. For example, the processor systems 214 and/or 218 may include one or more processors and a processor voltage regulator, and the memory systems 216 and 220 may include one or more memory devices and a memory voltage regulator.

The power system controller 204 is also coupled to a plurality of power detect circuits 222, 224, and 226. While the power system controller 204 in the power management system 200 of the illustrated embodiment is described herein as located at a central 12 volt power distribution point, which may be an input to a blade IHS, a backplane on a multi-node system, a circuit board on a monolithic IHS, and/or at a variety of other central power distribution points known in the art, the configuration of the power management system 200 may be modified from that illustrated. For example, the power system controller 204, the power detect circuits 222, 224, and 226, and/or other power management system components implemented within one or more PSU(s), one or more POL voltage regulator(s), and/or within or coupled to a variety of other power system locations known in the art. Furthermore, while three power detect circuits 222, 224, and 226 are illustrated, any number of power detect circuits may be implemented in the system to perform the functions discussed below. Each of the power detect circuits 222, 224, and 226 includes a storage 222a, 224a, and 226a, respectively, that is programmable by the power system controller 204, as discussed in further detail below. Each of the power detect circuits 222, 224, and 226 are coupled to an IHS controller 228.

The functionality of the programmable power detect circuits may be realized in a variety of ways depending on considerations including cost, space, accuracy, conversion speed, and/or a variety of other factors known in the art. In one embodiment, an analog implementation using resistors, capacitors, inductors, and operational amplifiers may be used. For example, a power detect circuit may include components for current sensing, signal conditioning, timer or counter generation, and/or combinational logic to determine when a sensed current level has exceeded a predetermined current amplitude for a predetermined time duration.

Figure 2B:
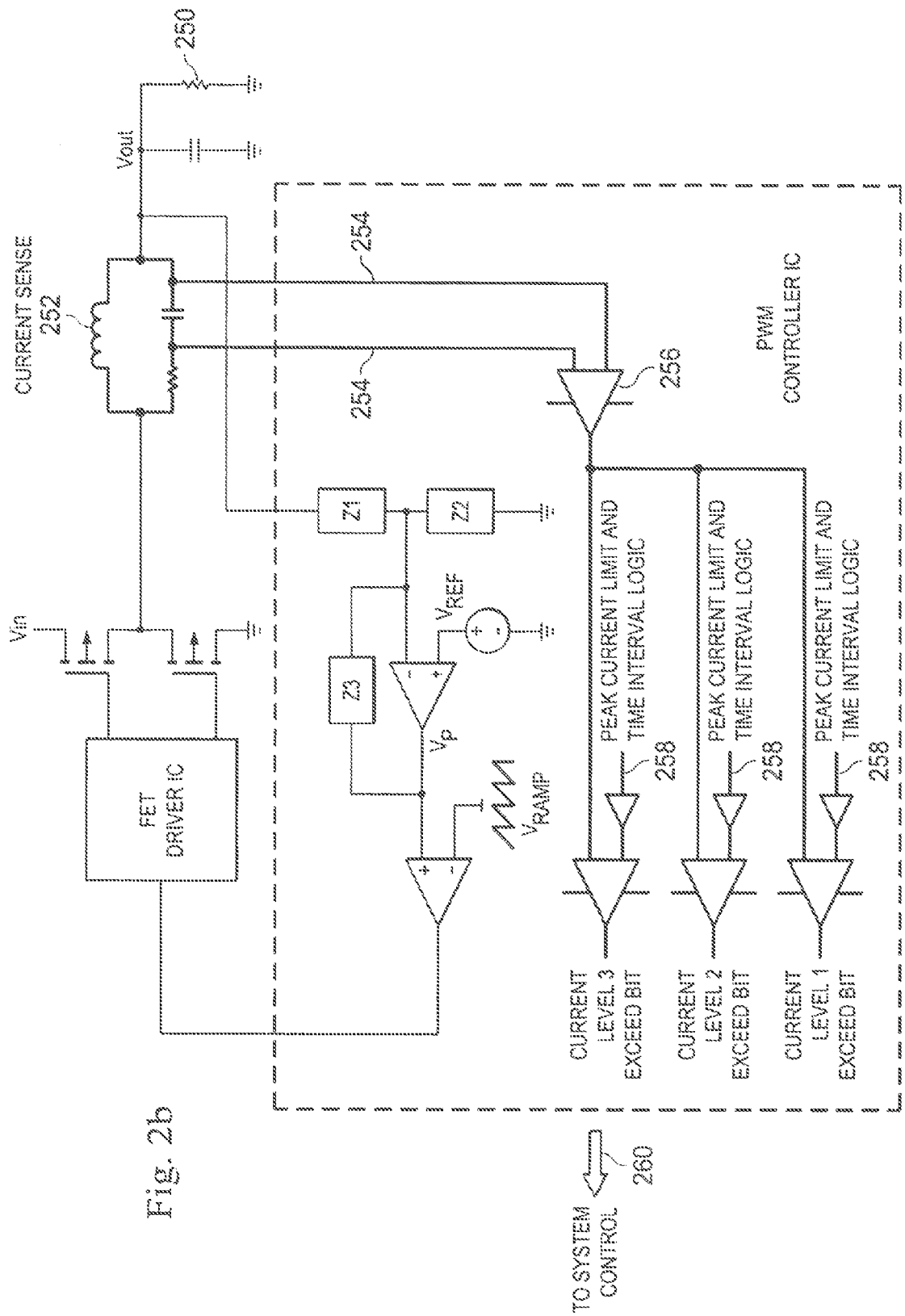

Referring now to FIG. 2b, an embodiment of the power detect circuits 222, 224, and 226 of FIG. 2a is illustrated, which includes a resistor 250 to represent the managed power load that may include an entire IHS 100 or one or more individual components of the IHS 100 such as, for example, the processor systems 214 or memory systems 216, 220. A current sensing circuit 252 is coupled to the resistor 250/managed power load and may be provided using parasitic resistance in an inductor. In other embodiments, the current sense circuit 252 may be provided using the resistance between the drain and source (RDS(on)) of a field effect transistor (FET), via a series precision resistive element, and or using a variety of other current sense devices known in the art. Voltage drops across the current sense circuit 252 are provided by a pair of Kelvin connections 254 to an operational amplifier 256 with a frequency response that is selected to eliminate false detects (e.g., based on noise.) The output of the operational amplifier 256 may be compared to a predefined current threshold and, once the sensed current exceeds the predefined current threshold, a timing element 258 (e.g., a resistor-capacitor (RC) time circuit) may be initiated. A combinational logic circuit may be used to determine whether the predefined current threshold is exceeded (e.g., if a current threshold logic output from the operational amplifier remains high) until the timing element reaches a predefined time duration. When both the predefined current threshold is exceeded for the predefined time duration, a level bit 260 may be asserted as an input to the system (e.g., via the IHS controller 228). When the sensed current falls below the predefined current threshold before the timing element reaches the predefined time duration, the level bit is not asserted and the timing element is reset until the next time the current predefined current threshold is exceeded. Such an analog power detect circuit may be provided for each current threshold that is to be detected.

Figure 3:
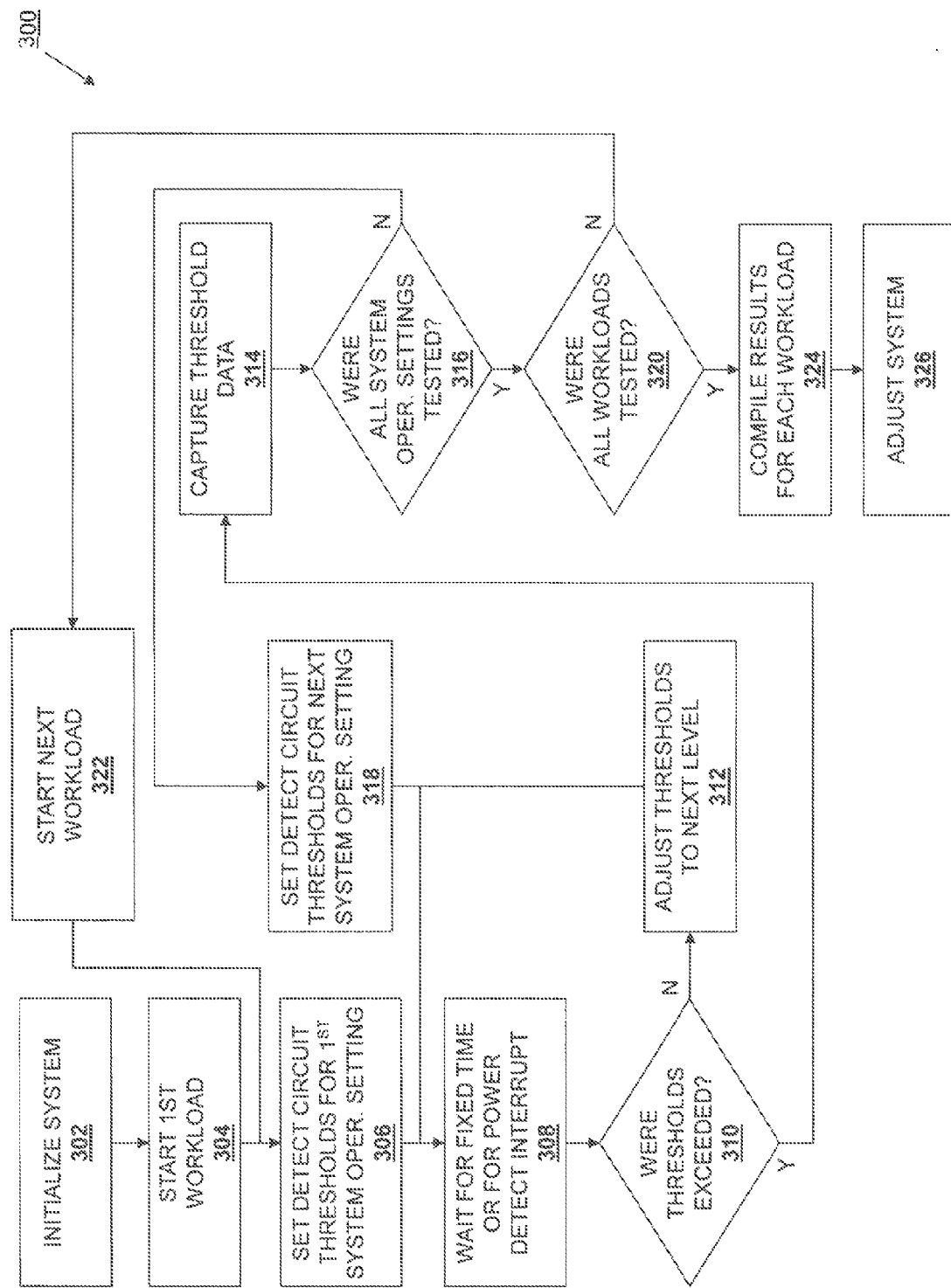
FIG. 3 is a flow chart illustrating an embodiment of a method for characterizing a system for power management.

Referring now to FIGS. 2a and 3, a method 300 for managing power using the power management system 200 is illustrated. In an embodiment, the method 300 is performed for relatively high-power-demand components in a system such as, for example, processors in an IHS. However, other embodiments may apply the method 300 to any and/or all the components in a system. The method 300 begins at block 302 where the system is initialized. In an embodiment, the power management system 200 is used with an IHS (e.g., the IHS 100) and block 302 of the method 300 includes the IHS beginning a Power-On Self-Test (POST), the IHS completing initialization, and the remainder of the method 300 being performed during POST and before the operating system for the IHS is up and running. The method 300 described below provides for the determination of in-situ characterization data during POST at a system level or subsystem levels by allowing the power system controller 204 to initiate a system workload or series of workloads at a sustainable power (i.e., average power ranging from seconds to an indefinite duration) and then use the power detect circuits 222, 224, and 226 to determine the actual system and subsystem peak and/or dynamic power demands that will be seen by the power system 202 when running the workload or series of workloads at different system operation settings. However, the method 300 and/or portions thereof may be performed at times other than POST while remaining within the scope of the present disclosure.

The method 300 the proceeds to block 304 where a first workload is started. One of skill in the art will recognize that a workload may include a series of instructions that cause an IHS to operate in a manner such that the workload is carried out. For example, at block 304, the power system controller 204 and/or other systems coupled to the power system controller 304 (e.g., a Basic Input/Output System (BIOS), a system management controller, and/or another system entity known in the art) will initiate a first workload such as, for example, a thermal virus, an application, a benchmark, and/or a variety of other system and/or subsystem characterization workloads known in the art. Workloads may also be chosen that generate maximum power usage by specific subsystems such as the processor systems 214/218, the memory systems 216/220, GPUs, storage drives, I/O adapters, etc. In response to initiating the first workload, the powered components in the system (e.g., the processor systems 214 and/or 218, the memory systems 216 and/or 220, and/or other powered components known in the art) will begin drawing power from the power system 202 in order to perform the functions required by the workload.

Figure 4:
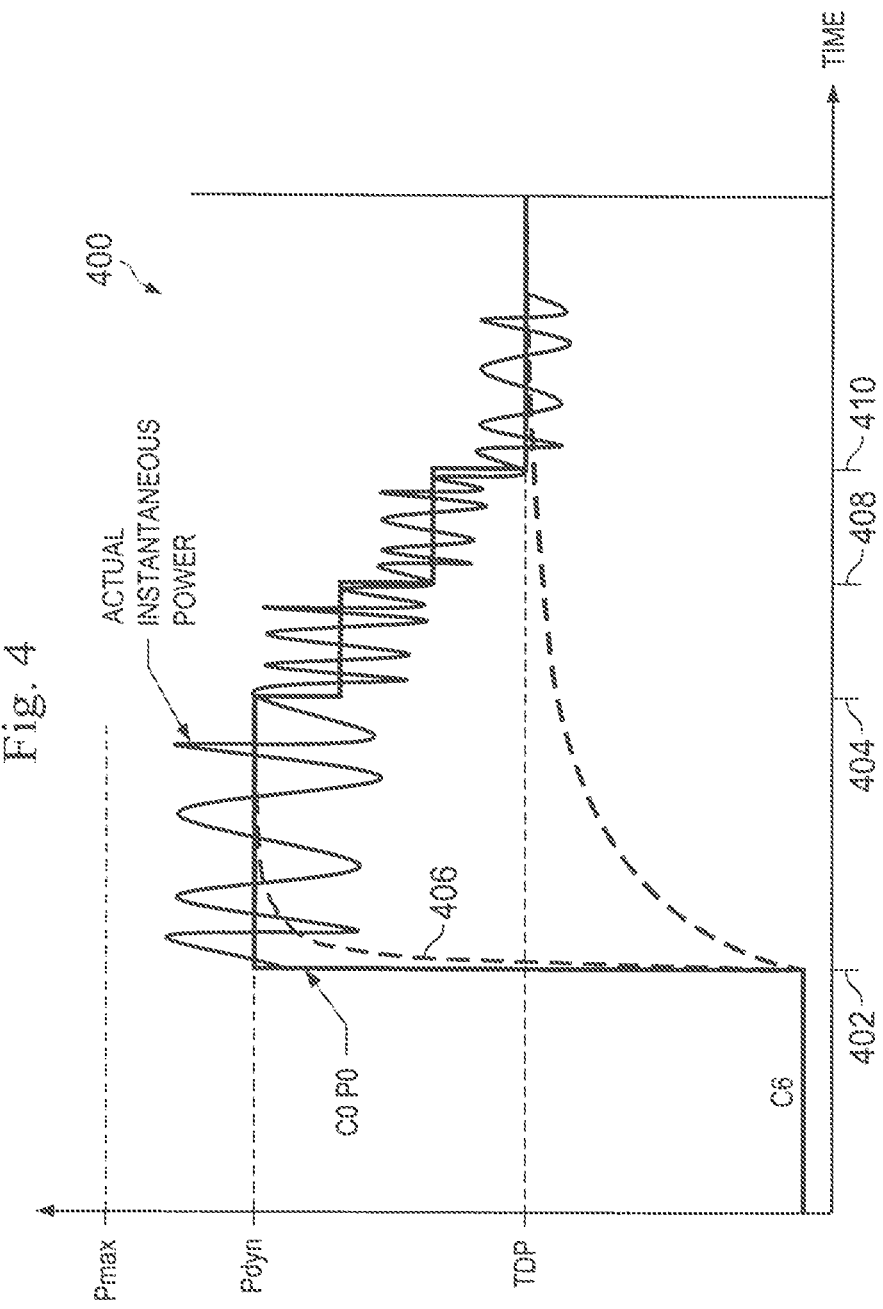
FIG. 4 is a graph illustrating an embodiment of a power curve produced during the method of FIG. 3.

Referring now to FIGS. 2, 3, 4, 5, 6, and 7, the method 300 then proceeds to block 306 where power detect circuit thresholds are set for a first system operation setting. A system operation setting may include one of more settings provided for a system (e.g., provided for the IHS by the IHS controller 228) that allow the system to operate in a particular manner. For example, a first system operation setting may include allowing one or more processors in a processor system to operate unrestrained, while a second system operation setting may include disabling a 'turbo mode" of one or more processors in a processor system, while a third system operation setting may include capping a performance state of one or more processors in a processor system, while a fifth system operation setting may include capping the operation of a memory device in a memory system (which will effect the operation of processors in the processor system), while a sixth system operation setting may include capping the operation of the entire system, and so on. In an embodiment, a first system operation setting may generate a first power curve associated with processor power demands up to dynamic power ($P_{dyn}$) and/or peak power ($P_{max}$), and thresholds may be set in the power detect circuits to detect those power demands. FIG. 4 illustrates an embodiment of a graph 400 of a power curve that shows power demand for a processor (e.g., a processor in the processor systems 214 and/or 218) based on a system operation setting (e.g., an unrestrained processor operation setting). The graph 400 illustrates the transition by the processor from a sleep state (e.g., the Advanced Configuration and Power Interface (ACPI) C6 power state in the illustrated embodiment) to an operating state (e.g., the ACPI C0 power state and processor P0 operating state), but one of skill in the art will recognize that a processor or other IHS components may include a variety of other power states and/or operating states that are not illustrated in FIG. 4. The transition of the processor from the sleep state to the operating state at time 402 in FIG. 4 is accompanied by a power demand that immediately reaches the dynamic power of the processor ($P_{dyn}$), with the actual, instantaneous power demand from the processor fluctuating above and below $P_{dyn}$ between time 402 and time 404 as the short-term average power 406 demanded by the processor approaches $P_{dyn}$. While not illustrated in FIG. 4, one of skill in the art will recognize that the actual instantaneous power drawn by the processor may fluctuate up to $P_{max}$ for periods of time. The power demand of the processor then steps down under $P_{dyn}$ several times (between time 404 and time 408, time 408 and time 410, and then beyond time 410 at which time long-term average power demand 412 of the processor begins to approach the Thermal Design Power (TDP) of the processor.

As discussed in further detail below, different system operation settings may generate different power curves similar to the power curve illustrated in FIG. 4, and thresholds may be set in the power detect circuits 222, 224, and 226 to detect power excursions performed while executing a workload with those different system operation settings. For example, the power system controller 204 may program the thresholds in the power detect circuits 222, 224, and/or 226 based on expected power curve behaviors such as current magnitudes, current widths, current areas, current slew rates, and/or a variety of other power criteria known in the art, and store those thresholds in the storages 222a, 224a, and/or 226a, respectively. In an embodiment, at block 304, the power system controller 204 may set thresholds in the power detect circuits 222, 224, and/226 at a first level. For example, a first level for the thresholds may be twice the TDP of the processor ("2.0×TDP") continuously sustained over a relatively short duration (e.g., milliseconds). Furthermore, when using multiple power detect circuits as in the illustrated embodiments, different thresholds (e.g., in magnitude and/or duration) may be set in different power detect circuits for a given level. For example, for the first level of 2.0×TDP, the power detect circuit 222 may be set with at a threshold of 80% of the first level, the power detect circuit 224 may be set at a threshold of 95% of the first level, and the power detect circuit 226 may be set at a threshold of 102% of the first level. The duration may be set the same in power detect circuits 222, 224, and/or 226, or may differ depending on the characterization attribute of interest.

Figure 5:
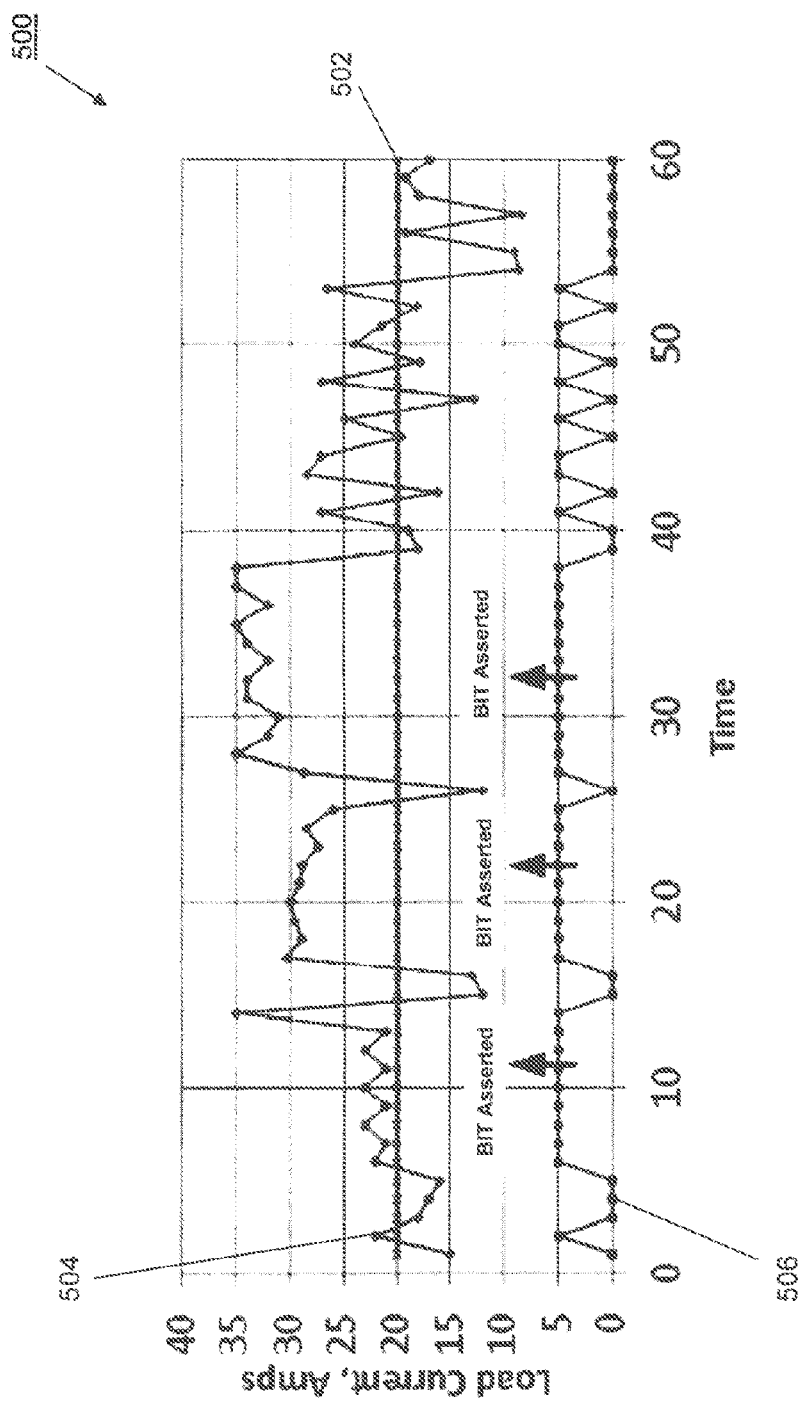
FIG. 5 is a graph illustrating an embodiment of the operation of a peak detect circuit in the power management system of FIG. 2.
Figure 6:
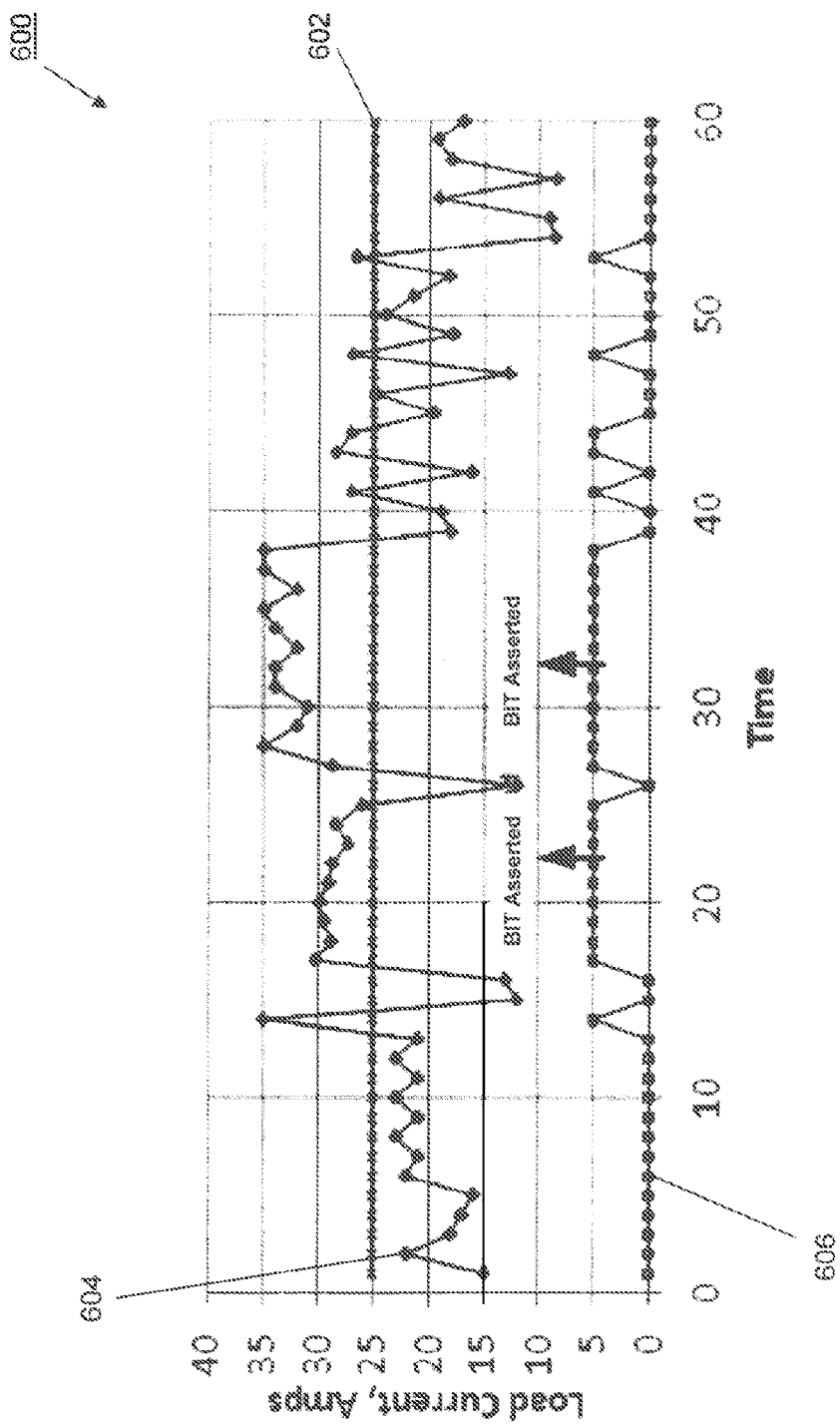
FIG. 6 is a graph illustrating an embodiment of the operation of a peak detect circuit in the power management system of FIG. 2.
Figure 7:
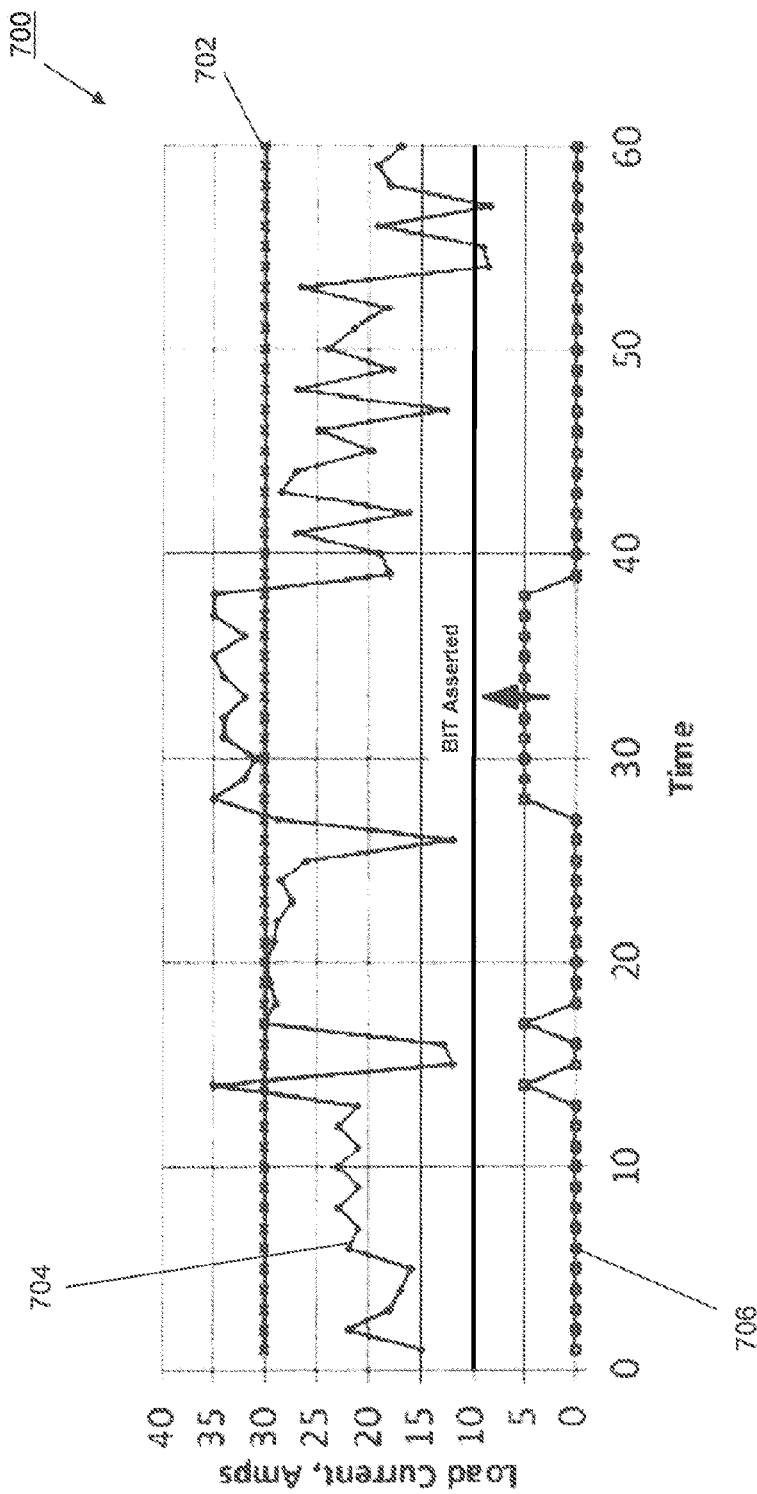
FIG. 7 is a graph illustrating an embodiment of the operation of a peak detect circuit in the power management system of FIG. 2.

FIG. 5 illustrates a graph 500 of load current vs. time. The graph 500 illustrates a first threshold 502 of 20 amps which, for example, may be programmed into the power detect circuit 222. FIG. 6 illustrates a graph 600 of load current vs. time. The graph 600 illustrates a second threshold 602 of 25 amps which, for example, may be programmed into the power detect circuit 224. FIG. 7 illustrates a graph 700 of load current vs. time. The graph 700 illustrates a third threshold 702 of 30 amps which, for example, may be programmed into the power detect circuit 226.

The method 300 then proceeds to block 308 where the power system controller 204 waits a fixed time or receives a peak power detect interrupt and, in response, proceeds to decision block 310 where the power system controller 204 determines whether one or more of the thresholds (e.g., magnitude and duration) were exceeded. For example, with the first workload running and the thresholds set in the power detect circuits 222, 224, and/or 226 for the first system operation setting, the power system controller 204 may wait for a peak power detect interrupt signal from one or more of the power detect circuits that is indicative of an exceeded threshold, or until a fixed amount of time has passed. If at decision block 310 the power system controller 204 determines that no thresholds were exceeded, the method 300 proceeds to block 312 where the thresholds are adjusted to a next level. As discussed in the example provided above, at block 306 of the method 300, the thresholds set in the power detect circuits 222, 224, and/or 226 were based on a first level of 2.0×TDP. Upon determining that none of the thresholds set in block 306 were exceeded, the thresholds in the power detect circuits 222, 224, and 226 may be adjusted to a second level. Using the example of the first level of 2.0×TDP set at block 306, the power system controller 204 may set the thresholds at a second level of 1.9×TDP. The method then proceeds back to block 308 where the power system controller 204 waits a fixed time or for a peak power detect interrupt, and then to decision block 310 where the power system controller 204 determines whether one or more thresholds were exceeded. Thus, for the first subsystem workload started at block 304, the power system controller 204 may provide different levels of thresholds for a first system operation setting until those thresholds are exceeded at blocks 306, 308, 310, and 312. In the embodiment illustrated in FIG. 2, the power system controller 204 may proceed from decision block 310 to block 314 after one of the thresholds set in one of the power detect circuits 222, 224, or 226 is exceeded, after a plurality of the thresholds set in the power detect circuits 222, 224, or 226 are exceeded, after all of the thresholds set in the power detect circuits 222, 224, or 226 are exceeded, and/or upon any sequence or number of thresholds set by a user are exceeded.

As discussed above, any of the power detect circuits 222, 224, and/or 226 may assert a bit when a programmed threshold is exceeded. The graph 500 in FIG. 5 of load current vs. time includes a load current 504 and a power detect circuit output 506 and, as can be seen, the power detect circuit output 506 goes high when the load current 504 exceeds the threshold 502 (e.g., for longer than 5 ms), but a bit is only asserted (three times in the illustrated embodiment) when the load current 504 exceeds the threshold 502 (and the power detect circuit output remains high) for a predetermined time duration (e.g., for longer than 100 ms). Similarly, the graph 600 in FIG. 6 of load current vs. time includes a load current 604 and a power detect circuit output 606 and, as can be seen, the power detect circuit output 606 goes high when the load current 504 exceeds the threshold 602, but a bit is only asserted (two times in the illustrated embodiment) when the load current 504 exceeds the threshold 502 (and the power detect circuit output remains high) for a predetermined time duration. Similarly, the graph 700 in FIG. 7 of load current vs. time includes a load current 704 and a power detect circuit output 706 and, as can be seen, the power detect circuit output 706 goes high when the load current 704 exceeds the threshold 702, but a bit is only asserted (one times in the illustrated embodiment) when the load current 704 exceeds the threshold 702 (and the power detect circuit output remains high) for a predetermined time duration.

In one example, the power detect circuit 226 may have been set with a threshold that is 100% of 1.8×TDP at block 306 or block 312, and in response to that threshold being exceeded for 100 ms, the power detect circuit 226 may have asserted a bit such that the power system controller 204 determines at block 310 that a threshold was exceeded. When one or more thresholds are determined to have been exceeded at decision block 310, the method 300 proceeds to block 314 where the threshold data is captured. Using the example given above, the power system controller 204 may retrieve data associated with the current exceeding 100% of 1.8×TDP for 100 ms for the first system operation setting and first subsystem workload, including current magnitude, current width (e.g., the continuous time that the current exceeded the threshold), current area (e.g., the area between the current and the threshold when the current exceeded the threshold), slew rate, and/or a variety of other threshold data known in the art.

The method 300 then proceeds to decision block 316 where it is determined whether all system operation settings have been tested. The power system controller 204 may be operable to provide a plurality of system operation settings for the system (each of which, when used to operate a workload, will cause the system generate a power curve similar to the one illustrated in FIG. 4), and decision block 316 may cause the power system controller to ensure each of those system operation settings have been tested for the first subsystem workload to determine when one or more thresholds are exceeded. In an example, the power system controller 204 may include a predetermined number of system operation settings such as, for example, an unconstrained processor operation setting, a processor turbo mode disabled setting, a processor performance state cap setting, a memory device operation cap setting, a system operation cap setting, etc, and decision block 316 may ensure that the first subsystem workload is performed for each of those system operation settings to determine when thresholds will be exceeded. One of skill in the art will recognize that any number of system operation settings may be used for testing the power response of the system when running a workload. If the power system controller 204 determines at decision block 316 that all the system operation settings have not been tested, the method 300 proceeds to block 318 where thresholds are set in the power detect circuits for a next system operation setting. As discussed above with reference to FIG. 4, one or more of the system operation settings associated with different operations of the system (e.g., varying power management states and/or settings, etc.) may be included in the power system controller 204 and cause the system to exceed thresholds set in the power detect circuits 222, 224, and/or 226. At block 318, a next system operation setting is selected that is different from the previous system operation setting used during the method 300, and thresholds are set in the power detect circuits at a first level. The method 300 then returns to blocks 308, 310, and/or 312 to determine when thresholds are exceeded and if not, adjust the thresholds to a next level, and if so, capture the threshold data at block 314 and return to decision block 316. Thus, for the first subsystem workload started at block 304, the power system controller 204 may provide different levels of thresholds for a plurality of different system operation settings until those thresholds are exceeded and capture the threshold data for each of those system operation settings such that the actual power requirements of the IHS are characterized for that workload at each system operation setting.

The method 300 then proceeds to decision block 320 where it is determined whether all workloads have been tested. As discussed above, the power system controller 204 starts a first workload that causes the system components to operate and draw power from the power system 202, and the power system controller 204 programs and monitors the power detect circuits 222, 224, and 226 to determine when thresholds are exceeded for different system operation settings. If at decision block 320 the power system controller 204 determines that all the workloads have not been tested, the method 300 proceeds to block 322 when a next workload is started and continues back to block 306 where the power detect circuits are set for a first system operation setting. Thus, the power system controller 204 is operable to determine, for each a plurality of workloads, when thresholds (e.g., magnitudes and/or durations) are exceeded at different levels for each of a plurality of system operation settings such that the actual power requirements are characterized for all workloads that the IHS may carry out.

If at decision block 320, the power system controller 204 determines that all the workloads have been tested, the method 300 proceeds to block 324 where the threshold results are compiled for each of the workloads. The method 300 then proceeds to block 326 where the system is adjusted. In an embodiment, at block 326, the power system controller 204 and/or the IHS controller 228 are operable to adjust system level power management profiles, power budgets, power capping, and power throttling for the powered components in the system using the data collected during the method 300. In an embodiment, following block 326 of the method 300, the IHS may complete POST and start the operating system, and power may be allocated to the powered components based on the thresholds determined during the method 300 such that those thresholds are not exceeded.

Thus, the method 300 allows the system to capture in-situ characterization data at the system and/or sub-system level using the power detect circuits 222, 224, and/or 226. The power system controller 204 initiates a system workload/workloads and programs/reprograms the power detect circuits 222, 224, and/or 226 for a plurality of system operation settings to determine the actual system and subsystem dynamic and peak power characteristics that will reach the power system 202. By determining actual/measured peak power and dynamic power requirements that will reach the power system 202 when operating the actual workloads that an IHS will run, and applying the necessary guard bands, the power system controller 204 may allocate and/or budget the specific power from the power system 202 that is required by the system and/or subsystems (rather than using theoretical maximum requirements) and take other power management actions to optimize the use of power by the system or subsystems, including reallocating unused power, allowing booting to the operating system, and/or setting power capping levels on specific subsystems or systems to fit within the power system limits.

Figure 8:
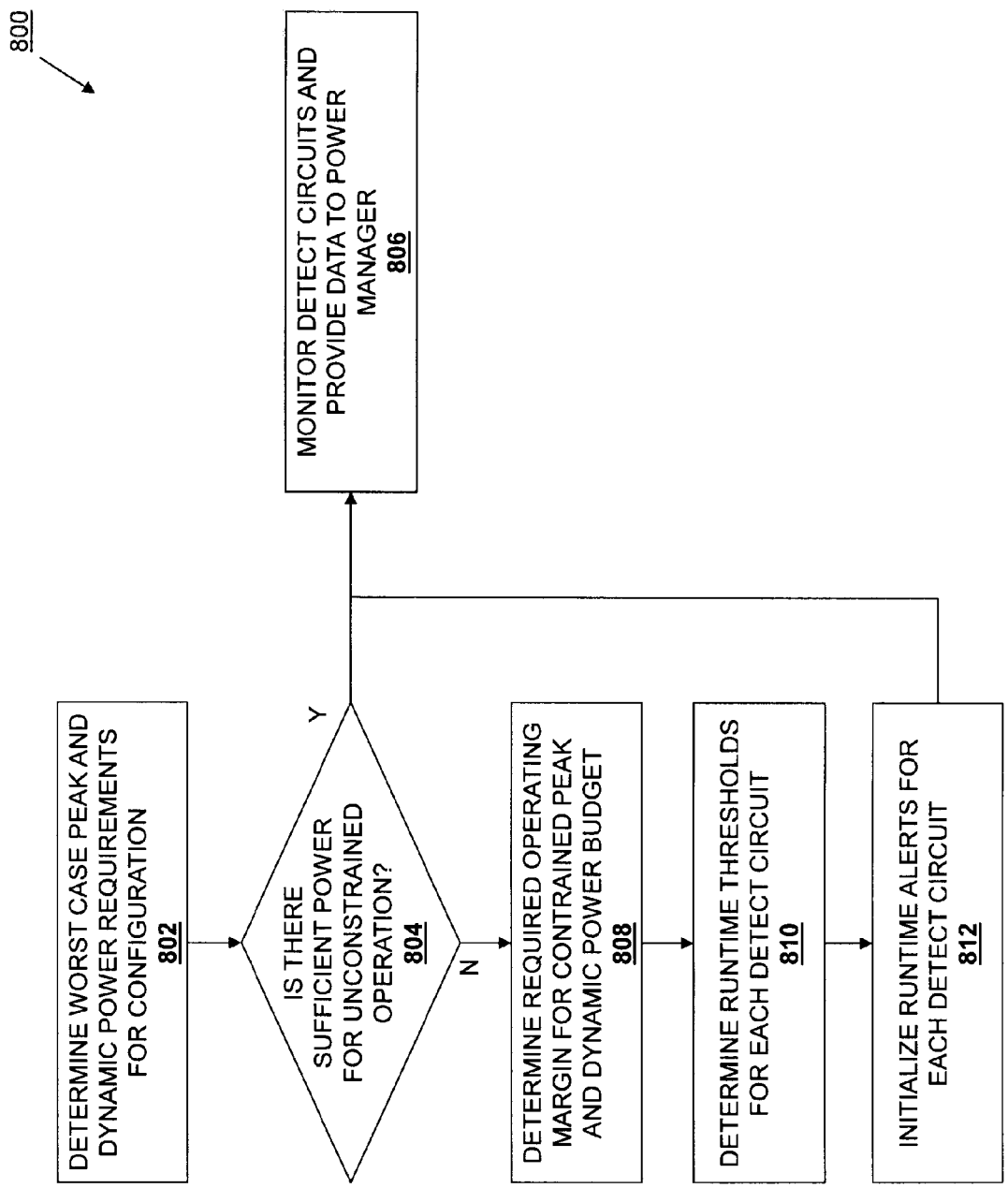
FIG. 8 is a flow chart illustrating an embodiment of a method for characterizing a system for power management.

The power management system may also be used during IHS runtime to actively monitor and/or assist in power management functions. FIG. 8 illustrates a method 800 using the power management system 200 to characterize the system for power management and then assist in providing power management functions. The method 800 begins at block 802 where worst-case peak and dynamic power requirements are determined for the system configuration and target workload(s). In an embodiment, the worst-case peak and dynamic power requirements may be determined for a system configuration and workloads as described above during the method 300. In an embodiment, the power detect circuits 222, 224, and 226 may be operable to perform sample-hold (e.g., track the highest magnitude) to accumulate worst case operating dynamic and peak power requirements over a time period (hours, days, indefinitely), and these results may be used in the method 800 and/or by other power management functions to optimize system performance and power use. For example, if it is found that worst case operating dynamic and/or peak power demands for an actual customer application/workload are only 80% of the characterized values (found during the method 300), the remaining 20% of the power may be re-allocated to other systems or subsystems. However, additional subsystems may be characterized during the method 800 that were not considered during the method 300 such as, for example, relatively lower power demand powered components that may affect power management but would require an extended time to characterize during IHS POST operations.

The method 800 then proceeds to decision block 804 where it is determined whether there is sufficient power for unconstrained operation. In an embodiment, the power system controller 204 uses the worst case peak and dynamic power requirements determined in block 802 and compares them to the output limits of the power system 202 to determine whether the power system 202 can supply sufficient power up to the worst case peak and dynamic operating levels of the powered components of the system. If the power system controller 204 determines that there is sufficient power for unconstrained operation of the system, the method 800 proceeds to block 806 where the power detect circuits are monitored and their data is provided to a power management entity. Thus, even if the power system 202 is capable of supplying sustainable power sufficient for unconstrained operation of the powered components of the system, the power detect circuits 222, 224, and/or 226 may still be used to collect telemetry data for use in managing power in the system.

If, at decision block 804, the power system controller 204 determines that the power system 202 is not capable of supplying power sufficient for unconstrained operation of the system, the method 800 proceeds to block 808 where a required operating margin is determined for a constrained peak power and dynamic power budget. For example, using the worst case peak power and dynamic power requirements of the system or subsystems and the power output limits of the power system 202, constrained peak power operating margins and/or dynamic power operating margins for the system or subsystems that should prevent the system or subsystems from exceeding the limits of the power system 202 may be determined. The additional operating margin (i.e., the "guard band") required to cover unanticipated power surges, account for inaccuracy of characterization data, ensure the power system is not operating at its specified limits, or for used for a variety of other reasons known in the art, may be system and application dependent. In addition, the selected operating margin will determine the probability that the power may exceed the runtime threshold limits of the unconstrained or constrained power budgets, as described in more detail below.

The method 800 then proceeds to block 810 where runtime thresholds are determined for each power detect circuit. Thresholds may be determined for the power detect circuits 222, 224, and/or 226 according to the operating margins for the system or subsystems and programmed into the power detect circuits 222, 224, and/or 226 such that bits will be asserted when power demand from the system or subsystems exceeds the thresholds. In an embodiment, runtime thresholds may be determined and programmed statically, or may be dynamically adjusted based on system workloads, time-of-day, power management states, the ambient thermal environment, as elements of the system are added or removed, and/or other operating conditions and states known in the art change over time.

The method 800 then proceeds to block 812 where runtime alerts are initiated for each power detect circuit. In an embodiment, alerts may be programmed for the power detect circuits 222, 224, and/or 226 according to the thresholds determined at block 810 of the method 800. For example, a "warning" alert may be set in the power detect circuit 222 for when peak power hits 80% of the rated power, a "danger" alert may be set in the power detect circuit 224 for when peak power hits 95% of the rated power, and a "critical" alert may be set in the power detect circuit 226 for when peak power hits 102% of the rated power. In an embodiment, the alerts may be implemented as discrete signals, may be implemented as interrupts within standard power management protocols (e.g., System Management Bus (SMBus) Alerts, Power Management Bus (PMBus) alerts, etc.) may be sent via system management messages over standard interfaces (e.g. SMBus, PMBus, etc.) or proprietary interfaces (e.g., Inter-Integrated Circuits ($I^2C$)), or may be provided in a variety of other manners known in the art such that the system may respond.

The method 800 then proceeds to block 806 where the power detect circuits are monitored and data is provided to a power management entity. In an embodiment, bits asserted by the power detect circuits 222, 224, and/or 226 based on exceeded thresholds may be monitored and provided to a power management entity (e.g., the power system controller 204, the IHS controller 208, etc.) and used to dynamically allocate power and adjust system operation to ensure that the power output limits of the power system 202 are not exceeded during runtime.

While the systems and methods illustrated and discussed above are directed to the processor systems 214 and 218, the present disclosure should not be limited to such embodiments, as a variety of other IHS components capable of high dynamic power and peak power relative to sustained power may benefit from the teachings herein, including but not limited to graphics processors, memory subsystems, storage subsystems, input-output subsystems, and/or a variety of other IHS components known in the art. Furthermore, the teachings of the present disclosure may be applied at the subsystem level, rather than at the central power distribution point as illustrated in FIG. 2a, in order to provide power monitoring and alerting as needed.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power management system, comprising:
    a power system;
    a power detect circuit coupled to the power system; and
    a power system controller coupled to the power system and the power detect circuit, wherein the power system controller is configured to:
        provide the power detect circuit with a first threshold for a system operation setting;
        determine that the first threshold for the system operation setting was not exceeded during the running of a workload and, in response, provide the power detect circuit with a second threshold for the system operation setting that is less than the first threshold; and
        determine that the second threshold for the system operation setting was exceeded during the running of the workload and, in response, use the second threshold for the system operation setting to manage system operations such that the capabilities of the power system are not exceeded.

2. The power management system of claim 1, wherein the first threshold and the second threshold are based on at least one of a power magnitude, a power width, a power area, and a power slew rate.

3. The power management system of claim 1, wherein the first threshold and the second threshold are based on a power measurement and a predetermined time duration.

4. The power management system of claim 1, wherein the first threshold includes a first percentage of the system operation setting, and wherein the second threshold includes a second percentage of the system operation setting that is greater than the first percentage.

5. The power management system of claim 1, wherein the power system controller is configured to:
provide the power detect circuit with a runtime alert setting based on one of the first threshold and the second threshold; and
determine that the runtime alert setting was exceeded during system operation and, in response, provide a runtime alert.

6. The power management system of claim 1, wherein the managing system operations such that the capabilities of the power system are not exceeded includes at least one of adjusting a power management profile, a power budget, power capping, and power throttling for a powered component.

7. The power management system of claim 1, wherein the managing system operations such that the capabilities of the power system are not exceeded includes at least one of reallocating unused power, allowing booting to an operating system, and setting power capping levels for one or more subsystems.

8. An information handling system (IHS), comprising:
a processing system;
a power detect subsystem coupled to the processing system; and
a power system controller coupled to the processing system and the power detect subsystem, wherein the power system controller is configured to couple to a power system and to:
provide the power detect subsystem with a first threshold for a system operation setting;
determine that the first threshold for the system operation setting was not exceeded during the running of a first workload, in response, provide the power detect subsystem with a second threshold for the system operation setting that is less than the first threshold; and
determine that the second threshold for the system operation setting was exceeded during the running of the first workload and, in response, use the second threshold for the system operation setting to manage system operations such that the capabilities of the power system are not exceeded.

9. The IHS of claim 8, wherein the first threshold and the second threshold are based on at least one of a power magnitude, a power width, a power area, and a power slew rate.

10. The IHS of claim 8, wherein the first threshold and the second threshold are based on a power measurement and a predetermined time duration.

11. The IHS of claim 8, wherein the first threshold includes a first percentage of the system operation setting, and wherein the second threshold includes a second percentage of the system operation setting that is greater than the first percentage.

12. The IHS of claim 8, wherein the power system controller is configured to:
provide the power detect subsystem with a runtime alert setting based on one of the first threshold and the second threshold; and
determine that the runtime alert setting was exceeded during system operation and, in response, provide a runtime alert.

13. The IHS of claim 8, wherein the managing system operations such that the capabilities of the power system are not exceeded includes at least one of adjusting a power management profile, a power budget, power capping, and power throttling for a powered component.

14. The IHS of claim 8, wherein the managing system operations such that the capabilities of the power system are not exceeded includes at least one of reallocating unused power, allowing booting to an operating system, and setting power capping levels for one or more subsystems.

15. A method for managing system operations, comprising:
providing a power detect subsystem with a first threshold for a system operation setting;
running a workload using at least one powered component;
determining that the first threshold for the system operation setting was not exceeded while the workload was run using the at least one powered component and, in response, providing the power detect subsystem with a second threshold for the system operation setting that is less than the first threshold; and
determining that the second threshold for the system operation setting was exceeded while the first workload was run using the at least one powered component and, in response, using the second threshold for the system operation setting to manage system operations such that the capabilities of a power system are not exceeded.

16. The method of claim 15, wherein the first threshold and the second threshold are based on at least one of a power magnitude, a power width, a power area, and a power slew rate.

17. The method of claim 15, wherein the first threshold and the second threshold are based on a power measurement and a predetermined time duration.

18. The method of claim 15, wherein the first threshold includes a first percentage of the system operation setting, and wherein the second threshold includes a second percentage of the system operation setting that is greater than the first percentage.

19. The method of claim 15, further comprising:
providing the power detect subsystem with a runtime alert setting based on one of the first threshold and the second threshold; and
determining that the runtime alert setting was exceeded during system operation and, in response, providing a runtime alert.

20. The method of claim 15, wherein the managing system operations such that the capabilities of the power system are not exceeded includes at least one of adjusting a power management profile for the at least one powered component, adjusting a power budget for the at least one powered component, adjusting power capping for the at least one powered component, adjusting power throttling for the at least one powered component, reallocating unused power, allowing booting to an operating system, and setting power capping levels for one or more subsystems.

* * * * *